United States Patent [19]

Kinoshita et al.

[11] Patent Number: 5,687,826
[45] Date of Patent: Nov. 18, 1997

[54] LUBRICATION SYSTEM FOR ONE-WAY CLUTCH

[75] Inventors: Yoshio Kinoshita; Toshio Awaji, both of Shizuoka-ken, Japan

[73] Assignee: NSK-Warner K.K., Tokyo, Japan

[21] Appl. No.: 547,597

[22] Filed: Oct. 24, 1995

[30] Foreign Application Priority Data

Oct. 25, 1994 [JP] Japan .................. 6-297790

[51] Int. Cl.$^6$ .................................... F16D 13/74
[52] U.S. Cl. .................... 192/113.32; 192/45.1; 188/264 D; 384/474
[58] Field of Search .............. 192/113.32, 113.3, 192/45.1; 188/82.1, 82.8, 264 D; 384/470, 474

[56] References Cited

U.S. PATENT DOCUMENTS 4,782,931 11/1988 Lederman .................. 192/113.32
4,961,486 10/1990 Kinshita et al. ............. 192/113.32
5,320,204 6/1994 Riggle et al. ................. 192/45.1

FOREIGN PATENT DOCUMENTS 1303816 1/1973 United Kingdom ........... 192/113.32

*Primary Examiner*—Andrea L. Pitts
*Attorney, Agent, or Firm*—Evenson, McKeown, Edwards & Lenahan, P.L.L.C.

[57] ABSTRACT

Disclosed is a lubrication system for a one-way clutch which is provided with an inner ring, an outer ring, and an end bearing having an inner and outer peripheral walls and disposed between the inner ring and the outer ring. The end bearing is provided on a side wall thereof with convexities extending in an axial direction. The convexities are partly open, thereby forming flow passages through which a lube oil scattered from a side of the inner ring toward a side of the outer ring is allowed to flow into the one-way clutch.

6 Claims, 3 Drawing Sheets

LUBRICATION SYSTEM FOR ONE-WAY CLUTCH

BACKGROUND OF THE INVENTION

1. Field of the Invention

This invention relates to a lubrication system for a one-way clutch.

2. Description of the Related Art

Among one-way clutches which can transmit rotating force in only one direction but idle in the opposite direction, so-called sprag or roller one-way clutches are widely used these days. In such a sprag or roller one-way clutch, clutch members such as sprags or rollers are arranged between an inner ring and an outer ring and are guided at both side walls thereof by end bearings, respectively, so that the clutch members engage he outer and inner rings upon transmission of rotating force but undergo sliding upon idling.

The fundamental construction of a one-way clutch is illustrated in FIG. 4, in which there are shown an inner ring 10, an outer ring 20, clutch members 30, end bearings 45, an oilway 50 for introducing a lube oil into the clutch, and a stop ring 60.

In a one-way clutch, clutch members repeatedly undergo engagement with an inner and outer rings and sliding due to idling. Substantial heat generation and friction therefore occur unless sufficient lubrication is applied. Further, it is also necessary to supply a lube oil sufficiently to avoid irregular rotation and/or seizure because end bearings are usually sliding bearings.

For this purpose, the one-way clutch is provided at a mounting portion therefor with a special lube-oil passage like the oilway 50 as shown in FIG. 4.

Even if a lube oil passage such as that shown in FIG. 4 is provided, supply of a lube oil into the one-way clutch cannot be performed surely when the inner ring remains stationary although the lube oil can be surely supplied into the one-way clutch under centrifugal lubricating action when the inner ring rotates. In the former case, a large majority of the lube oil does not flow through the oilway 50 in the inner ring 10 but is caused to scatter around the one-way clutch as indicated by arrows F, resulting in the problem that lubrication of the one-way clutch is impaired.

To achieve sufficient lubrication, it is necessary to increase the capacity of an oil pump as a supply source for the lube oil. An increase in the supply of the lube oil, however, leads to greater agitation resistance and viscous resistance due to the lube oil remaining in a larger amount around the one-way clutch, resulting in a greater power loss.

SUMMARY OF THE INVENTION

An object of the present invention is to sufficiently supply a lube oil into a one-way clutch without relying upon an oil pump having a greater capacity.

In one aspect of the present invention, there is hence provided a lubrication system for a one-way clutch provided with an inner ring, an outer ring, and an end bearing having an inner and outer peripheral walls and disposed between the inner ring and the outer ring. The end bearing is provided on a side wall thereof with convexities extending in an axial direction. The convexities are partly open, thereby forming flow passages through which a lube oil scattered from a side of the inner ring toward a side of the outer ring is drawn into the one-way clutch.

As the lubrication system according to the present invention for the one-way clutch is constructed as described above, openings of the convexities catch scattered lube oil and the thus-caught lube oil is introduced into the one-way clutch through the openings as flow passages. No large capacity is therefore needed for an oil pump as a lube oil supply source, a power loss is reduced, and the overall weight and dimensions of the one-way clutch are reduced. An improvement in gas mileage can therefore be expected.

DETAILED DESCRIPTION OF THE INVENTION AND PREFERRED EMBODIMENTS

Figure 1A:
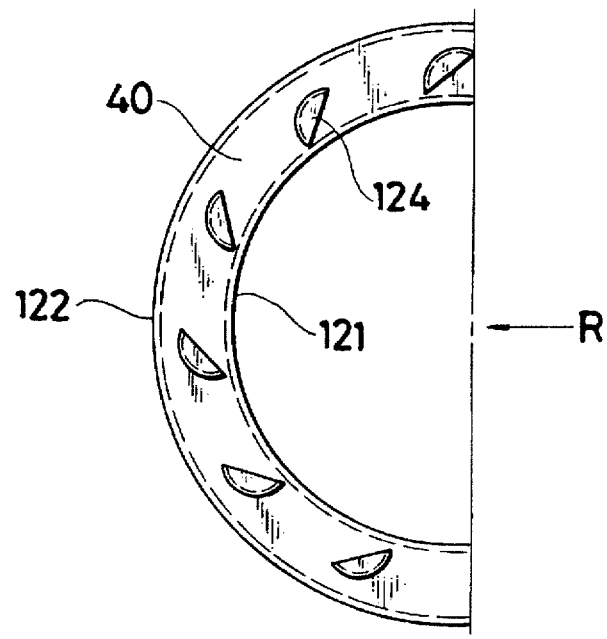
FIG. 1A is a front view of an end bearing forming a lubrication system according to a first embodiment of the present invention.
Figure 1B:
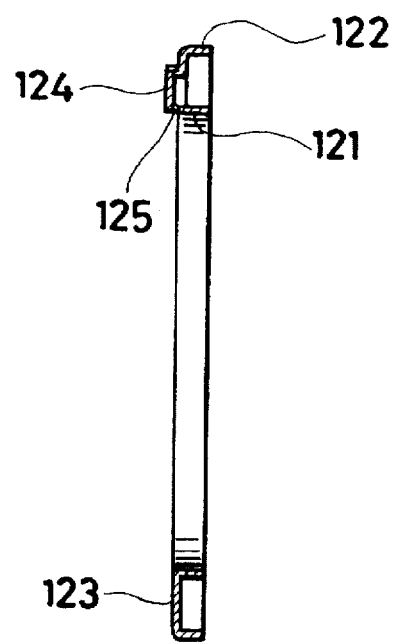
FIG. 1B is a side view of the end bearing of FIG. 1A as viewed in the direction of arrow R.

Referring first to FIGS. 1A and 1B, the end bearing forming the lubrication system according to the first embodiment of the present invention will be described. The end bearing 40 is provided on a side wall thereof with convexities 124, which are partly open to define openings 125. These figures also illustrate an inner peripheral wall 121, an outer peripheral wall 122 and the side wall 123, all of the end bearing 40. Each opening 125 is directed against the inner peripheral wall 121 and serves as a flow passage for a lube oil.

Figure 2A:
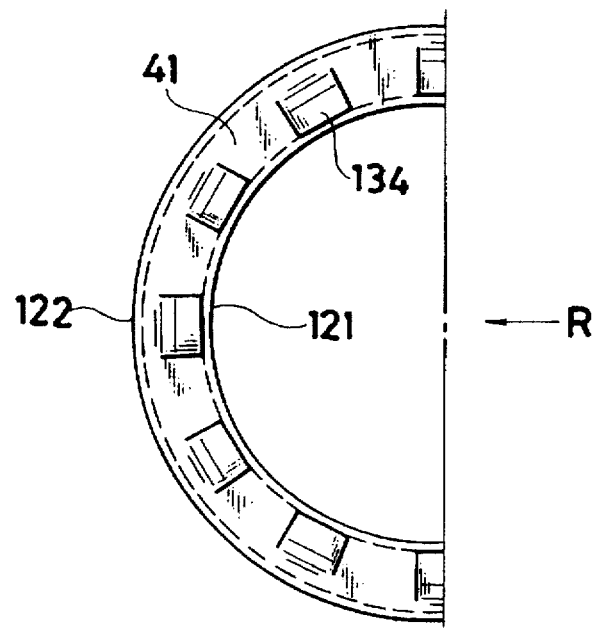
FIG. 2A is a front view of an end bearing forming a lubrication system according to a second embodiment of the present invention.
Figure 2B:
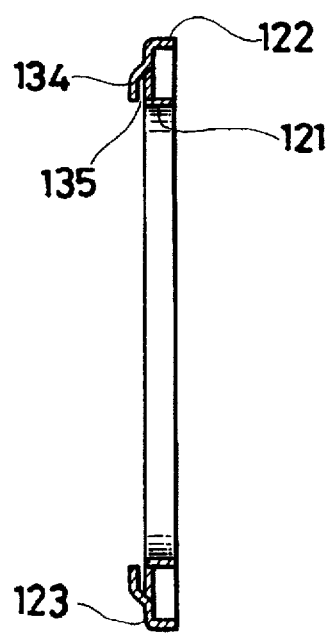
FIG. 2B is a side view of the end bearing of FIG. 2A as viewed in the direction of arrow R.

The end bearing forming the lubrication system according to the second embodiment of the present invention will next be described with reference to FIGS. 2A and 2B. Designated at numeral 134 are convexities arranged on a side wall 123 of the end bearing 41. Numeral 135 indicates an opening of each convexity 134.

Each convexity 124 in the first embodiment shown in FIGS. 1A and 1B is in the form of a zone of a sphere (i.e., a portion of a sphere, which is contained between two imaginary parallel planes intersecting the sphere) and its opening 125 is obliquely directed against the inner peripheral wall 121 of the end bearing 40. Each convexity 134 in the second embodiment depicted in FIGS. 2A and 2B is in the form of a step and its opening 135 is perpendicularly directed against the inner peripheral wall 121 of the end bearing 41. These openings 125, 135 serve as flow passages for the lube oil. It is to be noted that the shape of each convexity is not limited to those illustrated in the figures. For example, each convexity may be in the form of a quadrantal (¼) sphere.

Figure 3:
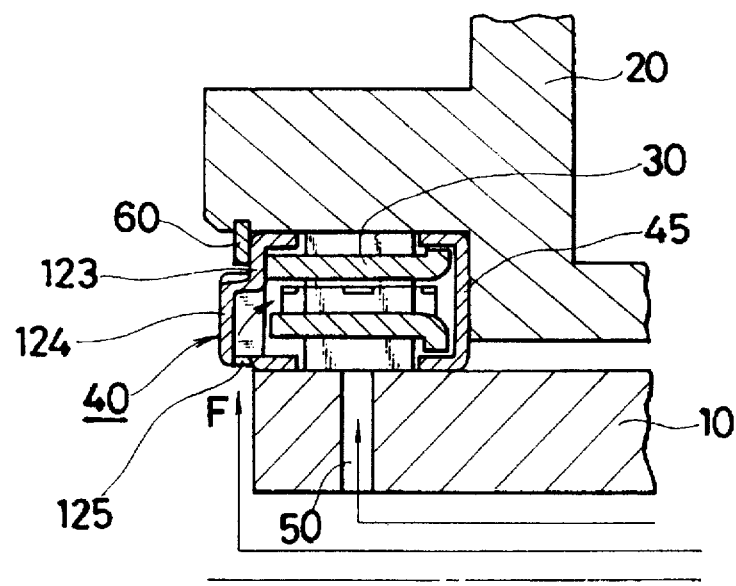
FIG. 3 is a side cross-sectional view of a one-way clutch having the lubrication system according to the first embodiment of the present invention.
Figure 4:
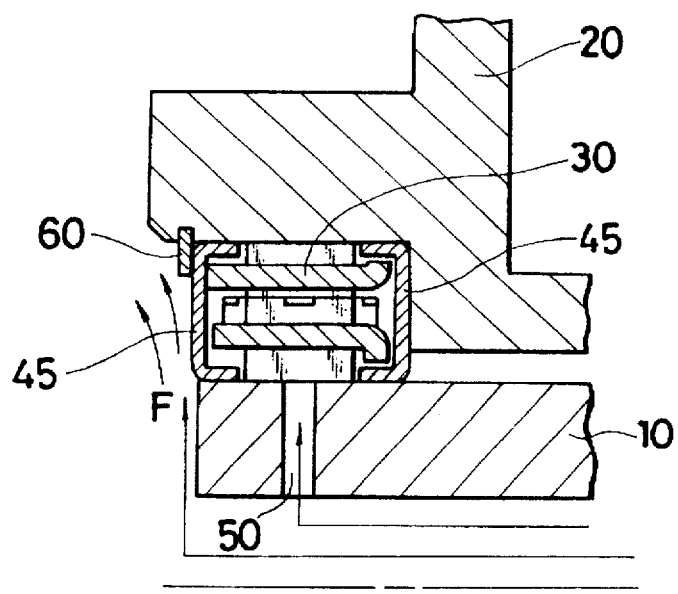
FIG. 4 is side cross-sectional view illustrating the construction of a conventional one-way clutch.

FIG. 3 illustrates the one-way clutch in which the end bearing 40, which are shown in FIGS. 1A and 1B and forms the lubrication system according to the first embodiment of the present invention, is assembled. Similarly to FIG. 4, there are illustrated the inner ring 10, the outer ring 20, the clutch members 30, the conventional convexity-free end bearing 45, the oilway 50, and the stop ring 60.

The end bearing 40 is provided on the side wall thereof with the convexities 124, which are partly open to define the openings 125 directed toward the inner peripheral wall 121 (see FIGS. 1A and 1B). The lube oil scattered from a side of the inner ring 10 toward a side of the outer ring 20 without flowing through the oilway 50 as indicated by arrow F is drawn into the one-way clutch through the openings 125, thereby making it possible to surely supply the lube oil. A lube oil in a one-way clutch with the end bearing 41 forming the lubrication system according to the second embodiment shown in FIGS. 2A and 2B is supplied similarly.

What is claimed is:

1. A one-way clutch provided with an inner ring, an outer ring, and an end bearing having an inner and outer peripheral walls and disposed between said inner ring and said outer ring, the improvement wherein said end bearing is provided on a side wall thereof with convexities extending in an axial direction from the side wall, and said convexities, form openings on an inner side thereof which catch lube oil flowing from a side of said inner ring toward a side of said outer ring to be introduced into said one-way clutch through the openings forming flow passages.

2. A lubrication system according to claim 1, wherein openings of said convexities on said side wall of said end bearing are perpendicularly directed against said inner wall.

3. A lubrication system according to claim 1, wherein openings of said convexities on said side wall of said end bearing are obliquely directed against said inner wall.

4. A lubrication system according to claim 1, wherein each of said convexities is in the form of a portion of a sphere.

5. A lubrication system according to claim 1, wherein each of said convexities is in the form of a step.

6. A one-way clutch provided with an inner ring, an outer ring, and an end bearing having inner and outer peripheral walls and disposed between said inner ring and said outer ring, the improvement wherein said end bearing is provided on a side wall thereof with convexities extending in an axial direction from the side wall, and said convexities having a bottom closed end facing the outer ring so as to form an opening directed toward the inner ring through which at least a portion of a lube oil scattered from a side of said inner ring toward a side of said outer ring is drawn into said one-way clutch.

* * * * *